US009660388B2

(12) United States Patent
Dunwoody

(10) Patent No.: US 9,660,388 B2
(45) Date of Patent: May 23, 2017

(54) CONNECTOR MODULE WITH CABLE POSITIONING FEATURES

(71) Applicant: Tyco Electronics Corporation, Berwyn, PA (US)

(72) Inventor: Steven David Dunwoody, Middletown, PA (US)

(73) Assignee: TE CONNECTIVITY CORPORATION, Berwyn, PA (US)

(*) Notice: Subject to any disclaimer, the term of this patent is extended or adjusted under 35 U.S.C. 154(b) by 0 days.

(21) Appl. No.: 14/340,133

(22) Filed: Jul. 24, 2014

(65) Prior Publication Data

US 2016/0028188 A1 Jan. 28, 2016

(51) Int. Cl.

| | |
|---|---|
| ***H01R 13/58*** | (2006.01) |
| ***H01R 13/6581*** | (2011.01) |
| ***H01R 13/502*** | (2006.01) |
| ***H01R 13/6592*** | (2011.01) |
| *H01R 13/516* | (2006.01) |
| *H02G 15/007* | (2006.01) |

(52) U.S. Cl.

CPC ....... *H01R 13/6581* (2013.01); *H01R 13/502* (2013.01); *H01R 13/6592* (2013.01)

(58) Field of Classification Search

CPC .. H01R 13/58; H01R 13/582; H01R 13/5833; H01R 13/5825; H01R 13/516; H02G 15/007

USPC ..... 439/465, 607.47, 607.56, 467, 456, 460, 439/696, 469, 472

See application file for complete search history.

(56) References Cited

U.S. PATENT DOCUMENTS

| | | | | |
|---|---|---|---|---|
| 3,784,961 A * | 1/1974 | Gartland, Jr. | H01R 13/595 174/156 |
| 5,217,389 A * | 6/1993 | MacKay | H01R 13/595 439/459 |
| 5,244,415 A * | 9/1993 | Marsilio et al. | 439/607.47 |
| 5,505,637 A * | 4/1996 | Kramer et al. | 439/607.48 |
| 5,848,914 A | 12/1998 | Lang et al. | |
| 6,056,588 A * | 5/2000 | Castaldo | H01R 13/502 439/469 |
| 6,126,478 A * | 10/2000 | Presson | H01R 13/595 439/467 |
| 6,280,235 B1 * | 8/2001 | Radliff | 439/467 |
| 6,805,578 B2 * | 10/2004 | Chiou | H01R 13/5812 439/469 |
| 6,955,558 B1 | 10/2005 | Low et al. | |
| 8,878,079 B2 * | 11/2014 | Colahan | 174/357 |
| 9,048,566 B2 * | 6/2015 | Wu et al. | |
| 2015/0075838 A1 * | 3/2015 | Buck et al. | 174/103 |

* cited by examiner

*Primary Examiner* — Amy Cohen Johnson
*Assistant Examiner* — Matthew T Dzierzynski

(57) ABSTRACT

A connector module includes a housing that extends along a longitudinal axis between a mating end and a cable end. The housing is defined by a first shell and a second shell that mate at a seam and define an interior chamber therebetween. The first shell and the second shell each includes a cable exit segment that has at least one cable positioning feature extending from an inner surface of the respective cable exit segment. Each cable positioning feature includes at least two posts and a slot defined therebetween. The slots of the cable positioning features are configured to receive a cable between the at least two posts of each corresponding cable positioning feature. The cable extends from the cable end of the housing.

19 Claims, 5 Drawing Sheets

CONNECTOR MODULE WITH CABLE POSITIONING FEATURES

BACKGROUND OF THE INVENTION

The subject matter herein relates generally to an electrical connector module that terminates to an end of an electrical cable.

In some electrical systems, an electrical connector, such as a plug or a receptacle, includes a cable extending from a housing. The housing holds electrical components, such as electrical contacts or a printed circuit board therein. The cable terminates to the electrical components within the housing. The housing of the electrical connector is configured to mate with a mating connector such that the electrical components within the housing electrically connect to electrical components of the mating connector. When mated to the mating connector, electrical power and/or data signals are transmitted between the electrical components of the mated connectors. The electrical connection between the mated connectors produces electromagnetic interference (EMI) within the housing. Electromagnetic interference is the disruption of operation of an electronic device due to an electromagnetic field caused by electromagnetic induction and/or radiation. The housing of the electrical connector may be configured to contain the EMI to prohibit the EMI from interfering with signal transmissions external to the housing, such as signals transmitted through the portion of the cable outside of the housing and/or other electronic devices in the surrounding environment. However, some known electrical systems fail to contain the EMI within the housing and electrical performance suffers as a result.

For example, EMI may leak through a cable opening in the housing through which the cable is received within the housing for electrical connection to the electrical components therein. The cable opening may be larger than the diameter of the cable such that the EMI leaks through gaps between the cable and the edge of the cable opening. In another example, some known housings are assembled by coupling two shells together, such that each shell defines at least part of the housing. The two shells couple together at a seam. If the two shells are not mated correctly, a gap may form at the seam, and EMI may leak through the gap out of the housing. For example, when assembling the electrical connector, a portion of the cable may get pinched between the two shells at the seam, the material in the seam produces a gap that allows EMI to escape the housing. A need remains for a connector module that provides better containment of EMI than prior art devices.

BRIEF DESCRIPTION OF THE INVENTION

In one embodiment, a connector module is provided that includes a housing extending along a longitudinal axis between a mating end and a cable end. The housing is defined by a first shell and a second shell that mate at a seam and define an interior chamber therebetween. The first shell and the second shell each includes a cable exit segment. The cable exit segments together define a cable exit region of the housing that includes the cable end. The cable exit segments of the first and second shells each includes at least one cable positioning feature extending from an inner surface of the respective cable exit segment. Each cable positioning feature includes at least two posts and a slot defined therebetween. The slots of the cable positioning features of the first and second shells are configured to receive a cable between the at least two posts of each corresponding cable positioning feature. The cable extends from the cable end of the housing.

In another embodiment, a connector module is provided that includes an upper shell and a lower shell. The lower shell mates to the upper shell at a seam. The upper shell extends between a mating end and a cable end. The lower shell extends between a mating end and a cable end. The mating and cable ends of the lower shell align with the mating and cable ends, respectively, of the upper shell. The seam extends between the mating ends and the cable ends. The upper and lower shells each include a cable exit segment that includes the cable end of the respective shell. The cable exit segment includes at least one cable positioning feature extending from an inner surface of the cable exit segment. Each cable positioning feature includes at least two posts and a slot. The slot is defined by inner walls of the at least two posts and a curved base that extends between the at least two posts. The slot of each cable positioning feature is sized to receive a cable between the at least two posts. As the lower shell mates to the upper shell, the cable positioning features of the upper and lower shells together define a cable channel configured to surround the cable that is received within the slot. The curved base of the at least one cable positioning feature of the upper shell defining an upper portion of a perimeter of the cable channel. The curved base of the at least one cable positioning feature of the lower shell defining a lower portion of the perimeter of the cable channel.

DETAILED DESCRIPTION OF THE INVENTION

Figure 1:
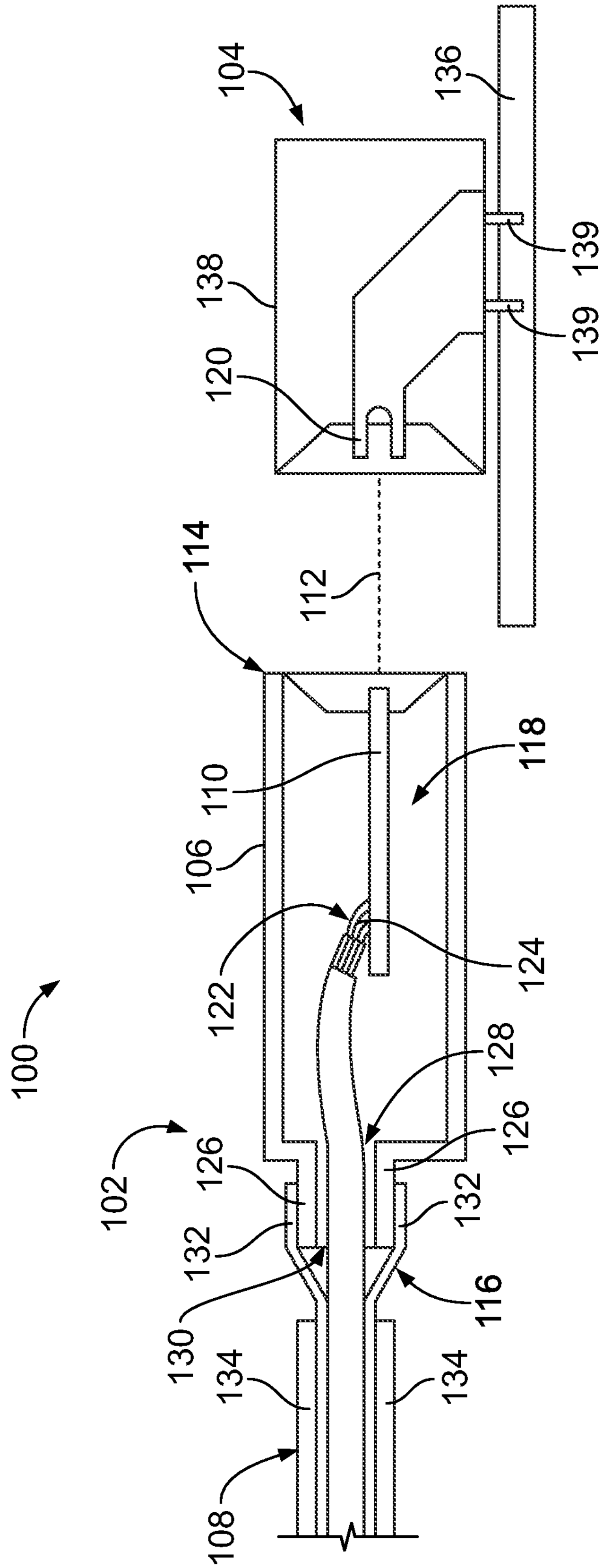
FIG. 1 is a side cross-sectional view of an electrical system in accordance with an embodiment.

FIG. 1 is a side cross-sectional view of an electrical system 100 in accordance with an embodiment. The electrical system 100 includes a connector module 102 and a mating connector 104. The connector module 102 is configured to mate with the mating connector 104 to form an electrical connection that provides a signal path through the connection module 102 and the mating connector 104. The connector module 102 may be a plug, and the mating connector 104 may be a receptacle that accommodates the plug. Alternatively, the connector module 102 is a receptacle, and the mating connector 104 is a plug.

The connector module 102 includes a housing 106, a cable 108, and an electrical component 110. The housing 106 extends along a longitudinal axis 112 between a mating end 114 and a cable end 116. The mating end 114 interfaces with the mating connector 104, and the cable end 116 receives the cable 108. In an alternative embodiment, another side or end of the housing 106 other than the mating end 114 may be configured to interface with the mating connector 104. For example, the housing 106 may be a right angle housing instead of an in-line housing. The housing 106 defines an interior chamber 118. The electrical component 110 is held within the interior chamber 118 of the housing 106. The electrical component 110 is configured to electrically connect to a mating electrical component 120 of the mating connector 104. The electrical component 110 in the illustrated embodiment is a circuit card or printed circuit board (PCB). In other embodiments, the electrical component 110 may be or include multiple conductive contacts. The cable 108 terminates to the electrical component 110 to transmit power and/or data signals to and/or from the electrical component 110. For example, the cable 108 may include one or more inner conductors 124 that electrically and mechanically engage contact pads (not shown) or conductive vias (not shown) of the electrical component 110. The inner conductors 124 may define a proximal end 122 of the cable 108 that is disposed within the interior chamber 118 of the housing 106. The cable 108 exits the interior chamber 118 via an opening 130 at the cable end 116 and extends from the housing 106.

In an embodiment, the housing 106 includes a cable exit region 126. The cable exit region 126 includes the cable end 116 of the housing 106. The cable exit region 126 provides a passage 128 for the cable 108 from the opening 130 at the cable end 116 to the interior chamber 118. The cable exit region 126 also provides a structure for coupling the cable 108 to the housing 106. For example, the cable 108 may include a braid 132 that is positioned along an exterior of the cable exit region 126. The braid 132 may be stretched from a non-expanded state within an outer jacket 134 of the cable 108 to an expanded state to position the braid 132 around the cable exit region 126. The braid 132 may be coupled to the cable exit region 126 by crimping a ferrule (not shown) onto the braid 132, by applying an adhesive, or the like, in order to mechanically and electrically connect the cable 108 to the housing 106.

The mating connector 104 includes a housing 138 that holds the mating electrical component 120 therein. In the illustrated embodiment, the mating electrical component 120 of the mating connector 104 includes multiple contacts arranged in an upper and a lower row. The multiple contacts are configured to electrically and mechanically engage corresponding contact pads (not shown) of the electrical component 110 (for example, PCB) of the connector module 102. In other embodiments, the mating electrical component 120 may include other arrangements of contacts or a circuit card instead of contacts. The mating connector 104 may be mounted on a printed circuit board 136. For example, the mating electrical component 120 may include conductive pin contacts 139 that are through-hole mounted to the printed circuit board 136. In other embodiments, the mating connector 104 may be coupled to a cable or a device instead of being mounted to the printed circuit board 136.

The electrical connection formed between the electrical component 110 and the mating electrical component 120 when the connector module 102 and the mating connector 104 are mated may generate electromagnetic interference (EMI). Electromagnetic interference may interfere with and degrade signal transmission along the signal path. In some known electrical systems, connector housings are designed to contain EMI within the housings to reduce detrimental effects on signal transmission external to the housings. Signal transmission external to the housings may include signal transmission along cables that extend from the housings and signal transmission through other electrical devices nearby the housings. As shown in FIG. 1, if EMI is not contained within the housings 106, 138, signal performance of the cable 108 and the PCB 136 may suffer, as well as devices coupled to or proximate to the cable 108 and the PCB 136. In some known electrical systems, however, the housings fail to effectively contain the EMI, and the performance of the electrical systems suffers as a result. Embodiments of the inventive subject matter described herein provide connector modules that more effectively contain EMI within housings of the connector modules, improving signal performance.

Figure 2:
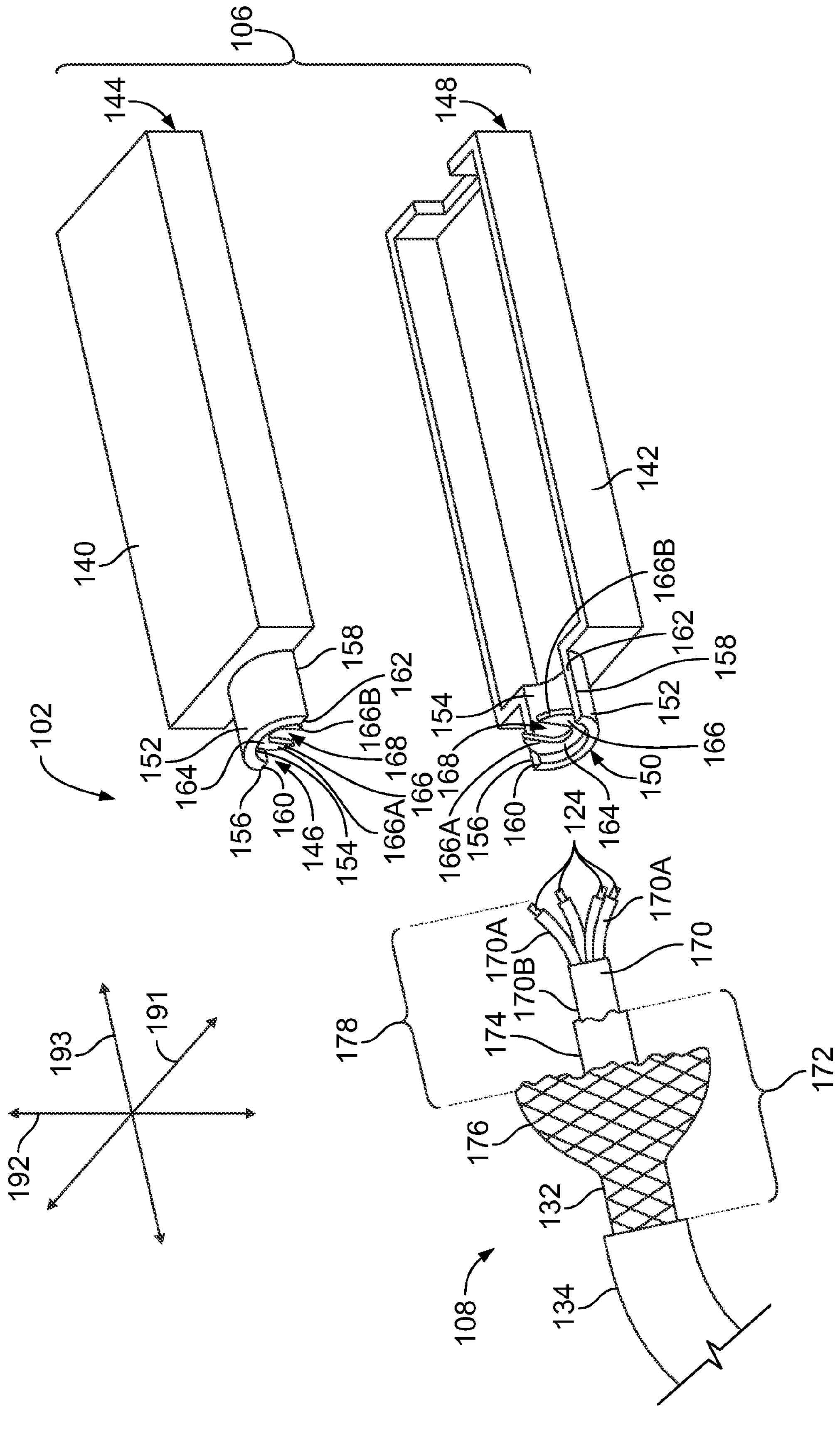
FIG. 2 is an exploded perspective view of a connector module of the electrical system according to an exemplary embodiment.

FIG. 2 is an exploded perspective view of the connector module 102 of the electrical system 100 shown in FIG. 1 according to an exemplary embodiment. The electrical component 110 (FIG. 1) of the connector module 102 is not shown in FIG. 2. The connector module 102 is oriented with respect to a lateral axis 191, an elevation axis 192, and a longitudinal axis 193. The longitudinal axis 193 may be the longitudinal axis 112 (shown in FIG. 1). The axes 191-193 are mutually perpendicular with respect to one another. Although the elevation axis 192 appears to extend in a vertical direction parallel to gravity in FIG. 2, it is understood that the axes 191-193 are not required to have any particular orientation with respect to gravity.

The housing 106 is defined by a first shell 140 and a second shell 142. The first and second shells 140, 142 mate at a seam 210 (shown in FIG. 5) to form the assembled housing 106. For example, each of the first and second shells 140, 142 include walls that enclose and define the interior chamber 118 (shown in FIG. 1) when the shells 140, 142 are mated. In the illustrated embodiment, the first shell 140 is disposed over the second shell 142. The first and second shells 140, 142 may be mated by moving the shells 140, 142 relatively together along the elevation axis 192. As used herein, the first shell 140 may be referred to as "upper shell" 140, and the second shell 142 may be referred to as "lower shell" 142. Relative or spatial terms such as "upper," "lower," "left," or "right" are only used to distinguish the referenced elements and do not necessarily require particular positions or orientations in the electrical system 100 (shown in FIG. 1) or in the surrounding environment of the electrical system 100.

The upper shell 140 extends between a mating end 144 and a cable end 146. The lower shell 142 also extends between a mating end 148 and a cable end 150. The mating and cable ends 144, 146 of the upper shell 140 align with the mating and cable ends 148, 150, respectively, of the lower shell 142 as the upper and lower shells 140, 142 are mated to form the housing 106. The seam 210 (shown in FIG. 5) may extend between the mating ends 144, 148 and the cable ends 146, 150.

The upper shell 140 and the lower shell 142 each include a cable exit segment 152 that extends parallel to the longitudinal axis 193. The cable exit segment 152 of the upper shell 140 includes the cable end 146, and the cable exit segment 152 of the lower shell 142 includes the cable end 150. When the shells 140, 142 are mated, the cable exit segments 152 define the cable exit region 126 (shown in FIG. 1) of the housing 106.

Each cable exit segment 152 includes a left edge 156 and a right edge 158 spaced apart along the lateral axis 191. The cable exit segment 152 may include a left side wall 160 at or proximate to the left edge 156 and a right side wall 162 at or proximate to the right edge 158. When the shells 140, 142 are assembled, the left side wall 160 of the cable exit segment 152 of the upper shell 140 may engage the left side wall 160 of the cable exit segment 152 of the lower shell 142, and the respective right side walls 162 may similarly engage each other. The side walls 160, 162 thus form a portion of the seam 210 (shown in FIG. 5) between the upper and lower shells 140, 142. Each cable exit segment 152 includes an inner surface 154. The inner surface 154 may extend between the left side wall 160 and the right side wall 162. In an alternative embodiment in which the cable exit segments 152 lack side walls, the inner surface 154 may extend between the left and right edges 156, 158 of the respective cable exit segments 152. The inner surface 154 may be arc-shaped. For example, the inner surface 154 may be curved in a concave arc relative to the side walls 160, 162 of the respective cable exit segment 152, such that the inner surface 154 bows away from the side walls 160, 162 (or edges 156, 158) as the inner surface 154 extends between the side walls 160, 162 (or edges 156, 158). When the shells 140, 142 are assembled, the inner surfaces 154 of the cable exit segments 152 combine to define the passage 128 (shown in FIG. 1) that extends between the cable end 116 (FIG. 1) and the interior chamber 118 (FIG. 1). In an alternative embodiment, the inner surface 154 of at least one of the cable exit segments 152 is not arc-shaped, but rather may include one or more linear walls, forming a V-shape, a box-shape, or the like.

In an exemplary embodiment, the cable exit segments 152 of the upper and lower shells 140, 142 each include at least one cable positioning feature 164 extending from the inner surface 154. Each cable positioning feature 164 includes at least two posts 166 and a slot 168 defined between the posts 166. The posts 166 may extend at least partially vertically along the elevation axis 192 towards the cable exit segment 152 of the opposing shell. For example, the posts 166 of the upper shell 140 extend downwards toward the lower shell 142, and the posts 166 of the lower shell 142 extend upwards toward the upper shell 140 in the illustrated embodiment. Each of the cable positioning features 164 shown in FIG. 2 include two posts 166 (for example, a left post 166A between the slot 168 and the left edge 156 and a right post 166B between the slot 168 and the right edge 158), although more or less than two posts 166 per cable positioning feature 164 may be used in other embodiments. The slot 168 is sized to receive the cable 108 between the at least two posts 166.

The upper and lower shells 140, 142 may be composed of one or more conductive materials, such as metal. The upper shell 140 may be composed of the same materials or at least one different material than the lower shell 142. In an embodiment, the shells 140, 142 are formed by a molding process, such as through die-casting. The at least one cable positioning feature 164 of each shell 140, 142 may be integrally formed with the cable exit segment 152 of the respective shells 140, 142. For example, the shells 140, 142 may be die-cast using a mold that defines the one or more cable positioning features 164. Die-casting is a low cost manufacturing option because the primary cost is the mold, and a single mold may be used to produce numerous identical parts. Since the at least one cable positioning feature 164 is integrally formed, production efficiency may increase by avoiding additional assembly steps required to add the cable positioning feature(s) 164 and connector defects attributable to the additional assembly steps.

The cable 108 includes the at least one inner conductor 124, at least one insulation layer 170, a cable shield 172, and the outer jacket 134. The at least one inner conductor 124 provides a signal path through the cable 108 for electrical signals. In the illustrated embodiment, the cable 108 includes four inner conductors 124. Optionally, the inner conductors 124 may be organized into two sets of two conductors and configured to convey differential signals. The inner conductors 124 are each individually surrounded by a first insulation layer 170A. Optionally, the insulation layers 170A may be commonly surrounded and enclosed within a second insulation layer 170B. The cable shield 172 includes at least one layer and is formed of at least one conductive material to provide electrical shielding of the signals traveling through the inner conductors 124 from EMI. The cable shield 172 of the cable 108 in FIG. 2 includes a foil layer 174 within and surrounded by the braid 132. The foil layer 174 and the braid 132 are both electrically conductive. A portion 176 of the braid 132 is shown in FIG. 2 in the expanded state in order to be positioned around the cable exit region 126 (shown in FIG. 1) of the housing 106.

A segment 178 of the cable 108 is received within the housing 106. The segment 178 may include the inner conductors 124, the insulation layers 170A, 170B, and the foil layer 174 of the cable shield 172. In an embodiment, the braid 132 and the outer jacket 134 do not enter the housing 106. The slots 168 of the cable positioning features 164 of the shells 140, 142 may be designed to accommodate a diameter of the segment 178 of the cable 108, which may be smaller than a diameter of the cable 108 including the braid 132 and the outer jacket 134. For example, the foil layer 174 may be the outer-most layer that engages the posts 166 of each cable positioning feature 164. Alternatively, the entire cable shield 172 (for example, both the braid 132 and the foil layer 174) is received in the housing 106, and each slot 168 is designed to accommodate a diameter of the cable 108 including the entire cable shield 172.

In an embodiment, the connector module 102 is assembled by inserting the cable 108 in the upper shell 140 or the lower shell 142, and mating the two shells 140, 142 to entrap the segment 178 of the cable 108 therebetween. In some known electrical systems that include electrical connectors assembled by joining two shells, at least a portion of the cable may be pinched at the seam between the shells during the assembly process. The force applied on the cable at the seam may damage the cable. In addition, the material of the cable sandwiched between the shells prohibits the shells from flush engagement at the seam, producing one or more gaps along the seam. The gaps may allow the release of EMI from the housing (as well as allowing externally-produced EMI to enter the housing), reducing the performance of the electrical system. Referring back to FIG. 2, the at least two posts 166 of each cable positioning feature 164 prohibit the cable 108 from interfering with the mating of the upper and lower shells 140, 142 at the seam 210 (shown in FIG. 5). Each post 166 of a corresponding cable positioning feature 164 is disposed between the slot 168 and either the left side wall 160 or the right side wall 162 of the cable exit segment 152. For example, the left post 166A of each cable positioning feature 164 of the upper shell 140 blocks the cable 108 from extending onto or over the corresponding left side wall 160 of the upper shell 140, so the cable 108 does not get pinched between the left side walls 160 of the respective shells 140, 142 as the shells 140, 142 are mated. The right post 166B of each cable positioning feature 164 similarly blocks the cable 108 from getting pinched between the right side walls 160 of the shells 140, 142 during mating.

Figure 5:
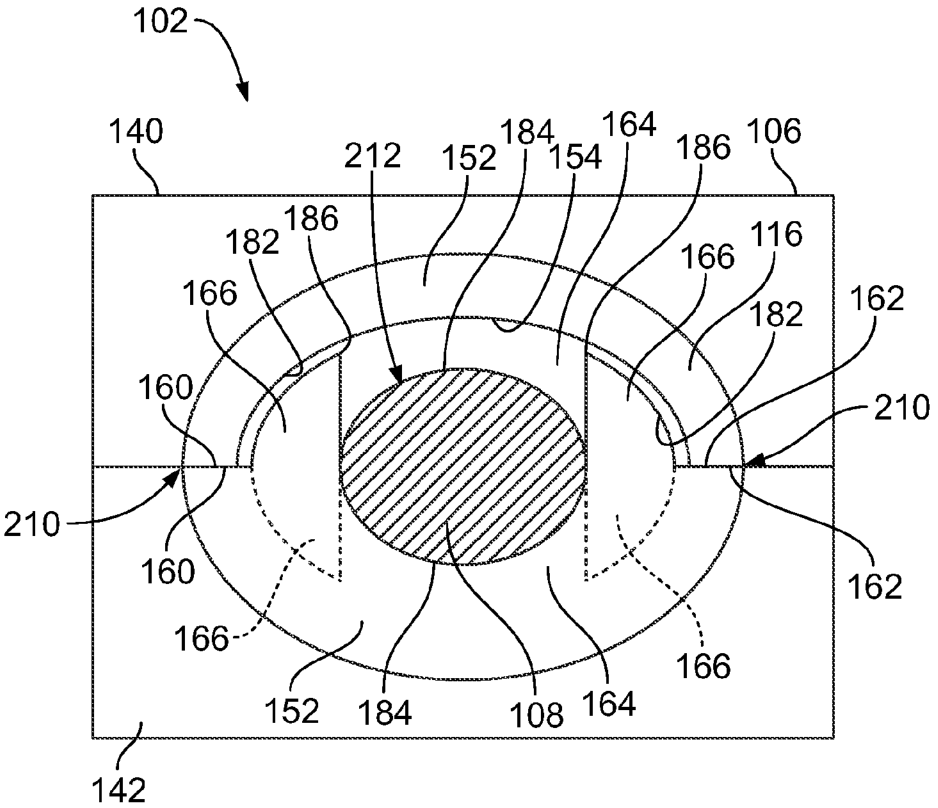
FIG. 5 is an end view of an embodiment of the connector module after assembly.

As the shells 140, 142 are mated, the at least one cable positioning feature 164 of the upper shell 140 combines with the at least one cable positioning feature 164 of the lower shell 142 to define a cable channel 212 (shown in FIG. 5)

extending along the longitudinal axis 193. For example, the at least one cable positioning feature 164 of the upper shell 140 may define an upper perimeter of the cable channel 212, and the at least one cable positioning feature 164 of the lower shell 142 may define a lower perimeter of the cable channel 212. The upper and lower perimeters may together define the entire perimeter of the cable channel 212. In an exemplary embodiment, each cable positioning feature 164 extends laterally across the entire inner surface 154 of the respective cable exit segment 152 between the left and right side walls 160, 162 (or left and right edges 156, 158 of the cable exit segment 152). Therefore, as the shells 140, 142 are mated and the cable exit segments 152 engage each other at the seam 210 (shown in FIG. 5), each cable positioning feature 164 of the upper shell 140 fills an upper portion of the cross-sectional area of the passage 128 (shown in FIG. 1), and each cable positioning feature 164 of the lower shell 142 fills a lower portion of the cross-sectional area of the passage 128. When the shells 140, 142 are mated, the cable channel 212 provides the only opening through the passage 128. In an embodiment, the cable channel 212 is sized and shaped to have a diameter equal to or smaller than a diameter of the segment 178 of the cable 108 within the cable channel 212 such that the cable 108 is sealed within the cable channel 212 and no gaps are formed between the cable 108 and the edges of the cable channel 212. The cable 108 seals the cable channel 212 to contain EMI within the interior chamber 118 (shown in FIG. 1) of the housing 106. Therefore, the combination of the at least one cable positioning feature 164 of the upper shell 140, the at least one cable positioning feature 164 of the lower shell 142, and the cable 108 within the cable channel 212 functions to seal the passage 128, prohibiting EMI from leaking through the cable end 116 (shown in FIG. 1) of the housing 106.

Figure 3:
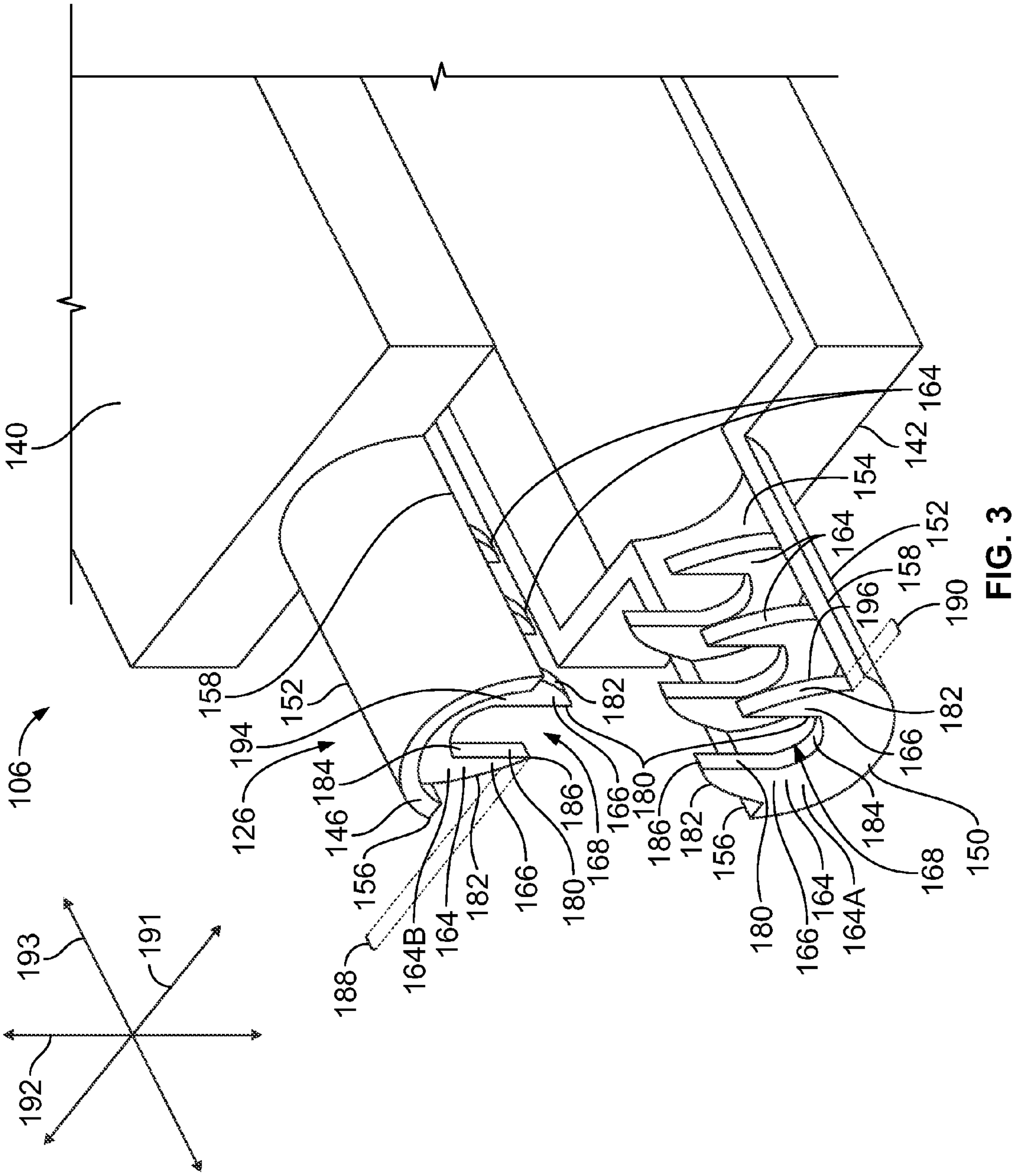
FIG. 3 is a close-up exploded perspective view of a cable exit region of a housing of the connector module according to an exemplary embodiment.

FIG. 3 is a close-up exploded perspective view of the cable exit region 126 of the housing 106 according to an exemplary embodiment. The posts 166 of the cable positioning features 164 of the upper and lower shells 140, 142 each have an inner wall 180 facing an opposing post 166 and an outer wall 182 facing one of the left edge 156 or the right edge 158 of the respective cable exit segment 152. The slot 168 of each cable positioning feature 164 is defined by the inner walls 180 of the posts 166 and a curved base 184. The curved base 184 extends between the inner walls 180 of the posts 166. The inner walls 180 may be linear, curved, or both. For example, the inner walls 180 near a distal end 186 of the posts 166 may be linear, and the inner walls 180 may curve proximate to the curved base 184. In an embodiment, the outer walls 182 are curved radially inwards toward the slot 168. The outer walls 182 are curved because the inner surface 154 of each of the cable exit segments 152 is arc-shaped. The curved outer walls 182 may allow the posts 166 to be received within the opposing cable exit segment 152 without contacting or otherwise interfering with the inner surface 154 of the opposing cable exit segment 152 as the shells 140, 142 are mated.

In an exemplary embodiment, the at least one cable positioning feature 164 of the cable exit segment 152 of the upper shell 140 is offset from the at least one cable positioning feature 164 of the cable exit segment 152 of the lower shell 142 along the longitudinal axis 193. When the shells 140, 142 are aligned and mated along the elevation axis 192, each cable positioning feature 164 of the upper shell 140 is axially spaced (along the longitudinal axis 193) relative to each cable positioning feature 164 of the lower shell 142. For example, as shown in FIG. 3, the cable positioning feature 164A of the lower shell 142 is positioned at the cable end 150 of the lower shell 142. The cable positioning feature 164B of the upper shell 140 is offset from the cable end 146 of the upper shell 140 along the longitudinal axis 193 in the direction towards the mating end 144 (shown in FIG. 2). As such, when the cable ends 146, 150 of the upper and lower shells 140, 142, respectively, are aligned and the shells 140, 142 are moved relatively together for mating, a vertical plane occupied by the cable positioning feature 164A does not intersect a vertical plane occupied by the cable positioning feature 164B. For example, although each of the posts 166 of the cable positioning features 164A, 164B may extend vertically into the opposing cable exit segment 152 when mated, the posts 166 do not contact each other and interfere with the mating because the posts 166 are offset. The cable positioning feature 164B of the upper shell 140 may be offset from the cable end 146 by a distance 188 that is equal to or slightly greater than a length 190 of the cable positioning feature 164A along the longitudinal axis 193. As a result, a front wall 194 of the cable positioning feature 164B may abut against or be disposed proximate to a back wall 196 of the cable positioning feature 164A when the shells 140, 142 are mated. The proximity of the cable positioning features 164A, 164B along the longitudinal axis 193 may improve EMI containment by reducing EMI leakage through the cable end 116 (shown in FIG. 1) of the housing 106. Optionally, the cable positioning feature 164A of the lower shell 142 may be offset from the cable end 150 in addition to, or instead of, the cable positioning feature 164B of the upper shell 140 being offset from the cable end 146.

In an embodiment, at least one of the cable exit segments 152 of the upper and lower shells 140, 142 includes multiple cable positioning features 164. In the illustrated embodiment, both cable exit segments 152 include three cable positioning features 164. The cable positioning features 164 of the upper shell 140 are spaced apart axially along the longitudinal axis 193. Likewise, the cable positioning features 164 of the lower shell 142 are spaced apart axially along the longitudinal axis 193. As the shells 140, 142 are mated, the cable positioning features 164 of the upper shell 140 may be offset with the cable positioning features 164 of the lower shell 142. The cable positioning features 164 may be interspersed or interleaved along the longitudinal axis 193 such that the cable positioning features 164 from the upper shell 140 alternate with the cable positioning features 164 of the lower shell 142 along a length of the cable exit region 126. In other embodiments, the cable exit segments 152 may include more or less than three cable positioning features 164 each, and the cable exit segment 152 of the upper shell 140 need not include the same amount of cable positioning features 164 as the cable exit segment 152 of the lower shell 142. Increasing the number of cable positioning features 164 may provide a better mechanical fit with the cable 108 received in the slots 168 of the cable positioning features 164. In addition, additional cable positioning features 164 provide additional blocking structures within the passage 128. Redundancy of blocking structures along the length of the cable exit region 126 may improve shielding and EMI containment.

Figure 4:
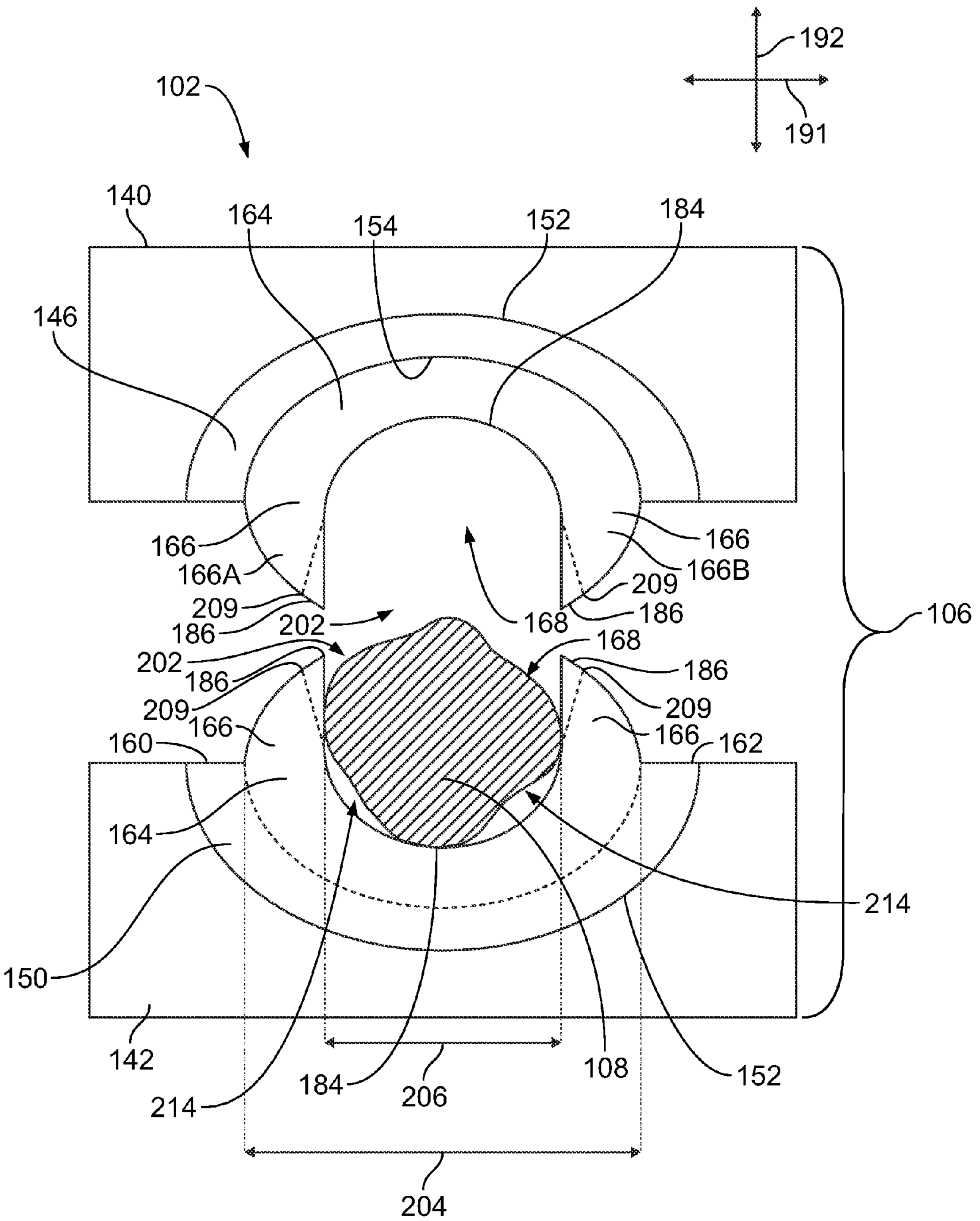
FIG. 4 is an end view of an embodiment of the connector module prior to assembly.

FIGS. 4 and 5 are end views of an embodiment of the connector module 102 at different stages of assembly. FIG. 4 shows the connector module 102 prior to assembly. FIG. 5 shows the connector module 102 after assembly. The end view of FIG. 4 shows the cable ends 146, 150 of the upper and lower shells 140, 142, respectively, viewed along the longitudinal axis 193 (shown in FIGS. 2 and 3). The end view of FIG. 5 shows the cable end 116 of the housing 106

(defined by the cable ends 146, 150 of the shells 140, 142) viewed along the longitudinal axis 193. A cross-section of the cable 108 is shown in FIGS. 4 and 5 to provide an unobstructed view of the housing 106.

Referring to FIG. 4, the upper and lower shells 140, 142 are poised for mating. The slots 168 of the cable positioning features 164 of the upper and lower shells 140, 142 may be U-shaped and oriented along the elevation axis 192. For example, the slots 168 have an open end 202 opposite the curved base 184. The open end 202 may be between the distal ends 186 of the posts 166. When poised for mating, the at least one cable positioning feature 164 of the upper shell 140 opposes (for example, mirrors) the at least one cable positioning feature 164 of the lower shell 142. Once the shells 140, 142 are mated, the open end 202 of each slot 168 is disposed proximate to the inner surface 154 of the cable exit segment 152 of the opposing shell 140 or 142 (as shown in FIG. 5).

During assembly, the cable 108 is received within the slot 168 of each cable positioning feature 164 of the lower shell 142 prior to mating the shells 140, 142. In an alternative embodiment, the cable 108 may be received in the slots 168 of the upper shell 140 instead of the lower shell 142, or may be received partially within the slots 168 of each of the shells 140, 142. The cable 108 is recessed laterally (along the lateral axis 191) from the left and right side walls 160, 162 of the cable exit segment 152 of the lower shell 142. For example, the left side wall 160 is spaced apart from the right side wall 162 by a first width 204. The slot 168 of the at least one cable positioning feature 164 has a second width 206 that is smaller than the first width 204 and between the side walls 160, 162. As such, the cable 108 within the slot 168 is recessed from the side walls 160, 162, and the cable 108 is not at risk for interfering with the engagement of the side walls 160, 162 of the upper and lower shells 140, 142.

In an embodiment, the upper shell 140 moves toward the lower shell 142 along the elevation axis 192 to mate the shells 140, 142. The posts 166 of the at least one cable positioning feature 164 of the upper shell 140 may be received around a perimeter of the cable 108. For example, the left post 166A may extend along a left side of the cable 108, and the right post 166B may extend along a right side of the cable 108 as the upper shell 140 descends onto the lower shell 142.

In an optional embodiment, the distal ends 186 of at least some of the posts 166 are tapered. For example, the posts 166 may taper laterally outward away from the slots 168. The optional tapered regions of the posts 166 including the tapered distal ends 209 are shown by dotted lines in FIG. 4. Tapering the posts 166 may reduce the risk of damaging the cable 108 during assembly of the shells 140, 142, such as when the posts 166 of the cable positioning feature 164 of the upper shell 140 are received around the perimeter of the cable 108 during mating. The tapered posts 166 are sufficiently wide at the distal ends 209 to avoid snagging, puncturing, or tearing one or more layers (for example, the foil layer 174 shown in FIG. 2) or components of the cable 108. The posts 166 are tapered to gradually guide the cable 108 laterally towards the interior of the slot 168.

Referring now to FIG. 5, the upper and lower shells 140, 142 are mated to define the assembled housing 106. The left side wall 160 of the lower shell 142 engages the left side wall 160 of the upper shell 140 at the seam 210. Likewise, the right side wall 162 of the lower shell 142 engages the right side wall 162 of the upper shell 140 at the seam 210. The seam 210 between the shells 140, 142 is an interface that extends around a boundary of the housing 106 except at openings defined between the shells 140, 142. The distal ends 186 of the posts 166 of the lower shell 142 are received in the cable exit segment 152 of the upper shell 140. The outer walls 182 of the posts 166 are curved to not interfere with the arc-shaped inner surface 154 of the cable exit segment 152 of the upper shell 140. Similarly, the posts 166 of the upper shell 140 are received in the cable exit segment 152 of the lower shell 142. The posts 166 of the upper shell 140 are disposed behind the cable positioning feature 164 of the lower shell 142, and thus are shown in FIG. 5 in phantom.

Once mated, the cable positioning features 164 of the upper and lower shells 140, 142 combine to define the cable channel 212 that surrounds and entraps the cable 108. For example, the curved base 184 of the cable positioning feature 164 of the upper shell 140 defines an upper perimeter (or an upper portion of the perimeter) of the cable channel 212. The curved base 184 of the cable positioning feature 164 of the lower shell 142 similarly defines a lower perimeter (or a lower portion of the perimeter) of the cable channel 212. Optionally, the upper and lower portions defined by the curved bases 184 may form the entire perimeter of the cable channel 212. Alternatively, at least part of the perimeter may be defined by the inner wall 180 (shown in FIG. 3) of one or more of the posts 166. In an embodiment, the cable channel 212 has an elliptical or circular cross-section.

The diameter of the cable channel 212 may be equal to or at least slightly smaller than the diameter of the cable 108 (for example, the diameter of the segment 178 of the cable 108 shown in FIG. 2). As the cable channel 212 is formed by the mating shells 140, 142, the edges of the cable positioning features 164 that define the cable channel 212 at least partially compress the cable 108 radially inward towards a center of the cable channel 212. The compression may force the cable 108 to take the shape of the cable channel 212 and fill in any gaps between the perimeter of the cable 108 and the edges of the cable positioning features 164 that define the cable channel 212. For example, as shown in FIG. 4, the cross-section of the cable 108 may have an irregular shape. As the cable 108 is positioned within the slot 168 of the cable positioning feature 164 of the lower shell 142, one or more gaps or spaces 214 may exist between the cable 108 and the cable positioning feature 164. Referring back to FIG. 5, the mating of the upper shell 140 at least partially compresses the cable 108 between the cable positioning features 164 of the upper and lower shells 140, 142, which forces the cable 108 to adopt the cross-section of the cable channel 212 and fills in the gaps or spaces 214 shown in FIG. 4. Thus, the cable 108 is sealed within the cable channel 212, which contains EMI within the housing 106. The combination of the cable positioning feature 164 of the upper shell 140, the cable positioning feature 164 of the lower shell 142, and the cable 108 within the cable channel 212 seals the passage 128 (shown in FIG. 1) and contains EMI within the housing 106.

Figure 6:
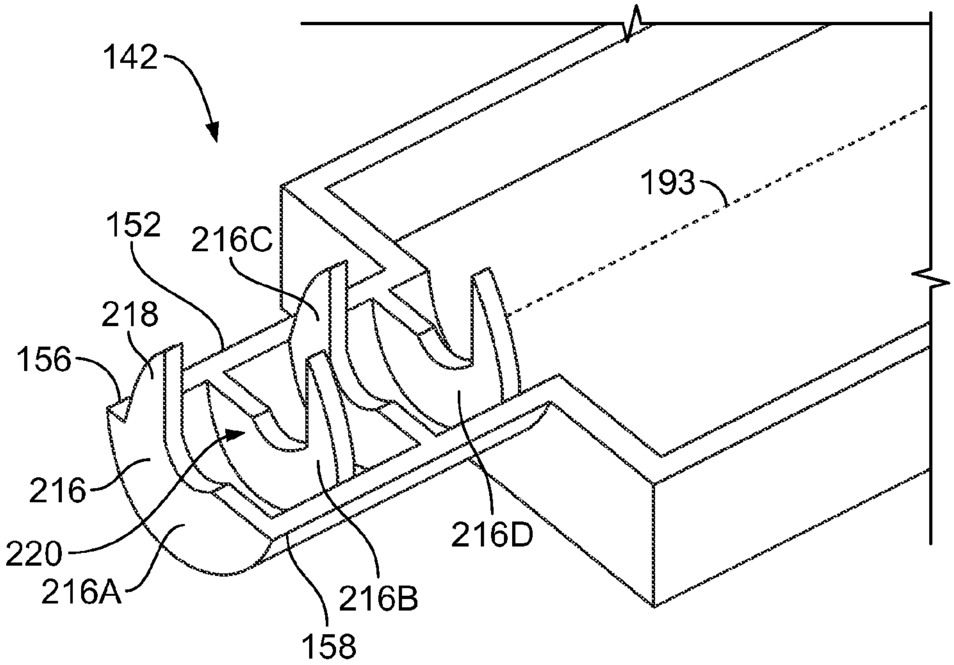
FIG. 6 is a close-up exploded perspective view of a portion of the lower shell of the housing according to an alternative embodiment.

FIG. 6 is a close-up exploded perspective view of a portion of the lower shell 142 of the housing 106 (shown in FIG. 1) according to an alternative embodiment. The cable exit segment 152 of the lower shell 142 includes multiple cable positioning features 216 spaced apart along the longitudinal axis 193. Each cable positioning feature 216 includes only one post 218. The post 218 of a first cable positioning feature 216A and the post 218 of third cable positioning feature 216C are both proximate to the left edge 156 of the cable exit segment 152. The posts 218 of second and fourth cable positioning features 216B, 216D, respectively, are both proximate to the right edge 158 of the cable exit segment 152. Thus, the posts 218 are staggered to alternate sides along the length of the cable exit segment 152. A cable channel 220 may be defined between the alternating posts 218. The cable channel 220 is parallel to the longitudinal axis 193. The cable channel 220 is configured to receive the cable 108 therein. The alternating posts 218 prohibit the cable 108 from being pinched at the edges 156, 158 of the lower shell 142 when the lower shell 142 mates with an upper shell (not shown) to define the housing 106. The upper shell may have one or more cable positioning features 216 that combine with the cable positioning features 216 of the lower shell 142 to provide shielding and EMI containment.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase “means for” followed by a statement of function void of further structure.

What is claimed is:

1. A connector module comprising:

a housing extending along a longitudinal axis between a mating end and a cable end, the housing defined by a first shell and a second shell that mate at a seam and define an interior chamber therebetween, the first shell and the second shell each including a cable exit segment, the cable exit segments together defining a cable exit region of the housing that includes the cable end, the cable exit segments of the first and second shells each including multiple cable positioning features extending from an inner surface of the respective cable exit segment, each cable positioning feature including two posts and a slot defined therebetween, the slot is defined by inner walls of the two posts and a curved base that extends between the inner walls of the two posts, wherein the cable positioning features of the cable exit segment of the first shell are interleaved along the longitudinal axis with the cable positioning features of the cable exit segment of the second shell, the cable positioning features of the first shell being offset from the cable positioning features of the second shell along the longitudinal axis such that each cable positioning feature of the first shell is axially spaced relative to each cable positioning feature of the second shell, and wherein the slots of the cable positioning features of the first and second shells are configured to receive a cable between the two posts of each corresponding cable positioning feature, the cable within the slots engaging the inner walls of the posts and the curved bases of the cable positioning features of both the first and second shells, the cable extending from the cable end of the housing.

2. The connector module of claim 1, wherein the seam between the first and second shells at the cable exit region of the housing is formed by side walls of the cable exit segment of the first shell engaging corresponding side walls of the cable exit segment of the second shell, each post of a corresponding cable positioning feature disposed between the slot and one of the side walls of the respective cable exit segment such that the post blocks the cable from extending into the seam between the side walls as the first and second shells are mated.

3. The connector module of claim 1, wherein the first and second shells together define a cable channel extending along the longitudinal axis, the curved bases of the cable positioning features of each of the first and second shells defining at least portions of a perimeter of the cable channel.

4. The connector module of claim 3, further comprising the cable, wherein a segment of the cable received in the slots of the cable positioning features includes at least one inner conductor, at least one insulation layer surrounding the at least one inner conductor, and a shield layer surrounding the at least one insulation layer, wherein the cable channel defined by the cable positioning features of the first and second shells has a diameter at least one of equal to or smaller than a diameter of the segment of the cable such that the cable positioning features directly engage the shield layer of the cable and the cable is sealed within the cable channel.

5. The connector module of claim 4, wherein the shield layer is a foil layer and the cable further includes a braid surrounding the foil layer, the cable positioning features directly engaging the foil layer, the braid positioned along an exterior of the cable exit region of the housing and coupled thereto to mechanically and electrically connect the cable to the housing.

6. The connector module of claim 1, wherein the cable positioning features are formed integral with the cable exit segment of the respective first and second shells.

7. The connector module of claim 1, wherein distal ends of the posts of at least one of the cable positioning features are tapered such that a width of the corresponding slot at the distal ends is greater than a width of the slot proximate to the inner surface of the respective cable exit segment from which the cable positioning feature extends.

8. The connector module of claim 1, wherein, upon mating the first and second shells, distal ends of the posts of the cable positioning features of the first shell protrude beyond the seam into the cable exit segment of the second shell and at least partially overlap the posts of the cable positioning features of the second shell.

9. The connector module of claim 8, wherein the cable positioning features of the first and second shells each have a front wall that faces the cable end of the housing and a back wall that faces the interior chamber of the housing, wherein, upon mating the first and second shells, the front wall of one cable positioning feature of the first shell abuts the back wall of one cable positioning feature of the second shell.

10. The connector module of claim 1, wherein the cable positioning features on the cable exit segment of the first shell each have a front wall and an opposite, back wall, the cable positioning features of the first shell being spaced apart along the longitudinal axis such that a first cable positioning feature of the first shell is separated from an adjacent, second cable positioning feature of the first shell by a space that is defined longitudinally between the back wall of the first cable positioning feature and the front wall of the second cable positioning feature, wherein, upon mating the first and second shells, the posts of one of the cable positioning features of the second shell protrude vertically beyond the seam into the cable exit segment of the first shell and are received in the space.

11. A connector module comprising:

an upper shell extending between a mating end and a cable end; and a lower shell that mates to the upper shell at a seam, the lower shell extending between a mating end and a cable end that align with the mating end and the cable end, respectively, of the upper shell, the seam extending between the mating ends and the cable ends, the upper and lower shells each comprising:

a cable exit segment that includes the cable end of the respective shell, the cable exit segment including multiple cable positioning features extending from an inner surface of the cable exit segment, each cable positioning feature including at least two posts and a slot, the slot defined by inner walls of the posts and a curved base that extends between the posts;

wherein, as the lower shell mates to the upper shell, the cable positioning features of the upper and lower shells together define a cable channel that circumferentially surrounds a cable, the cable within the cable channel being received within the slots of the cable positioning features such that the cable engages the inner walls of the posts and the curved bases of the cable positioning features of the upper and lower shells, the curved bases of the cable positioning features of the upper shell defining an upper portion of a perimeter of the cable channel and the curved bases of the cable positioning features of the lower shell defining a lower portion of the perimeter of the cable channel.

12. The connector module of claim 11, wherein the cable positioning features of the cable exit segment of the upper shell are offset from the cable positioning features of the cable exit segment of the lower shell along a longitudinal axis such that each cable positioning feature of the upper shell is axially spaced relative to each cable positioning feature of the lower shell.

13. The connector module of claim 11, wherein the cable positioning features of the upper shell are interleaved along a longitudinal axis with the cable positioning features of the lower shell upon mating the upper and lower shells.

14. The connector module of claim 11, wherein the cable channel has at least one of a circular or elliptical cross-section.

15. The connector module of claim 11, wherein the cable exit segments of the upper shell and the lower shell each include side walls, the side walls of the upper shell engaging the side walls of the lower shell to define the seam when the upper and lower shell are mated, the posts of the cable positioning features of the upper shell having distal ends that protrude downward beyond the seam into the cable exit segment of the lower shell, the posts of the cable positioning features of the lower shell having distal ends that protrude upward beyond the seam into the cable exit segment of the upper shell.

16. The connector module of claim 15, wherein the inner surface of the cable exit segment of each of the upper and lower shells is arc-shaped, the distal ends of the posts of each cable positioning feature having outer walls that are curved radially inwards toward the slot defined therebetween such that the posts do not interfere with the arc shaped inner surface of the opposing shell as the distal ends of the posts are received in the opposing cable exit segments as the upper and lower shells are mated.

17. The connector module of claim 11, wherein the inner surfaces of the cable exit segments of the upper and lower shells combine as the upper and lower shells are mated to define a passage that extends between the cable ends and an interior chamber defined between the upper and lower shells, wherein the cable positioning features of the upper shell combine with the cable positioning features of the lower shell and the cable disposed in the cable channel to seal the passage.

18. The connector module of claim 11, wherein the upper and lower shells mate along an elevation axis, the slots of the cable positioning features of the upper and lower shells being U-shaped having an open end opposite the curved base and oriented along the elevation axis, the cable positioning features of the upper shell opposing the cable positioning features of the lower shell such that the open end of each slot is disposed proximate to the inner surface of the cable exit segment of the opposing shell as the upper and lower shells mate.

19. The connector module of claim 11, further comprising the cable, wherein the slots of the cable positioning features of the upper and lower shells have a size at least slightly smaller than a diameter of a segment of the cable that is received within the upper and lower shells such that, as the lower shell mates to the upper shell, the inner walls and the curved bases of the cable positioning features that define the cable channel directly engage and at least partially compress an outer surface of the segment of the cable radially inward towards a center of the cable channel.

* * * * *